Figure 1:
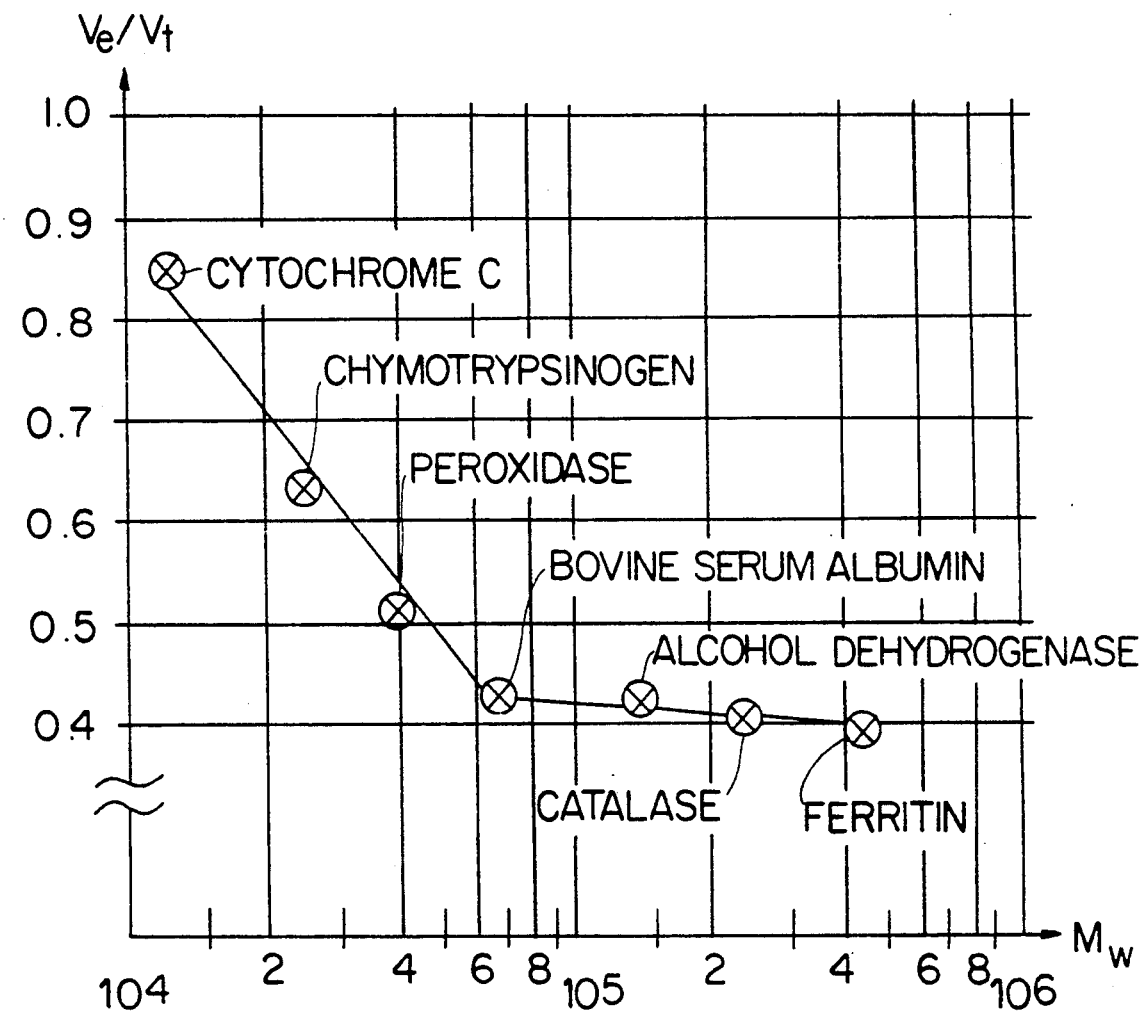

United States Patent [19]

Goeldner et al.

[11] Patent Number: 5,294,491

[45] Date of Patent: Mar. 15, 1994

[54] CROSSLINKED, ACTIVATABLE, HYDROPHILIC CARRIER BEADS

[75] Inventors: Ernst Goeldner, Darmstadt; Dieter Kraemer, Mainz; Ursula Artmann, Bickenbach; Dieter Zwara, Reinheim, all of Fed. Rep. of Germany

[73] Assignee: Röhm GmbH, Darmstadt, Fed. Rep. of Germany

[21] Appl. No.: 24,824

[22] Filed: Mar. 1, 1993

Related U.S. Application Data

[63] Continuation of Ser. No. 759,447, Sep. 13, 1991, abandoned.

[30] Foreign Application Priority Data

Sep. 15, 1990 [DE] Fed. Rep. of Germany ....... 9013137

[51] Int. Cl.$^5$ .................. B32B 27/30; C08F 216/20; C08F 236/00
[52] U.S. Cl. .................. 428/402; 526/332; 526/336
[58] Field of Search .................. 526/332, 336; 428/402

[56] References Cited

U.S. PATENT DOCUMENTS

| | | | |
|---|---|---|---|
| 3,268,484 | 8/1966 | Costanza | 526/332 |
| 3,616,936 | 11/1971 | Johannson et al. | 210/504 |
| 4,038,140 | 7/1977 | Jaworek et al. | 195/63 |
| 4,190,713 | 2/1980 | Kraemer et al. | 521/149 |
| 4,208,309 | 6/1980 | Kraemer et al. | 260/8 |
| 4,511,694 | 4/1985 | Kraemer et al. | 525/54.1 |

FOREIGN PATENT DOCUMENTS

| | | |
|---|---|---|
| 0058767 | 9/1982 | European Pat. Off. . |
| 0190495 | 8/1986 | European Pat. Off. . |
| 0296926 | 12/1988 | European Pat. Off. . |
| 1954349 | 5/1970 | Fed. Rep. of Germany . |
| 2722751 | 11/1978 | Fed. Rep. of Germany . |
| 1004669 | 9/1965 | United Kingdom . |
| 2061954 | 5/1981 | United Kingdom . |

OTHER PUBLICATIONS

George Odian, Principles of Polymerization, 3rd ed., 1992, John Wiley & Sons, Inc. pp. 302–303.

*Primary Examiner*—Joseph L. Schofer
*Assistant Examiner*—Wu C. Cheng

[57] ABSTRACT

A copolymer, adaptable to use as a bead-like carrier material for affinity chromatography, of a hydrophilic allyl monomer of the formula $CH_2=CH-CH_2-O-R-X_n$, wherein n is 0 and R is hydrogen, or n is a whole number from 1 to 5 and R is an (n+1)-valent aliphatic hydrocarbon group, and X is the same or different hydrophilic hydroxylic group, which copolymer is crosslinked by units of a polyfunctional comonomer in which at least two ethylenically unsaturated groups are linked by a chain containing a carbonamide or ether group.

4 Claims, 1 Drawing Sheet

CROSSLINKED, ACTIVATABLE, HYDROPHILIC CARRIER BEADS

This application is a continuation, of application Ser. No. 07/759,447, filed Sep. 13, 1991 now abandoned.

The present invention relates to a highly crosslinked, bead-like, activatable, hydrophilic carrier material having a macroporous structure which is either per se absorptive as a carrier for biologically activated materials or which can, by reaction with a bifunctional activating agent, be put into a condition where it is capable of bonding with biologically activated materials and can be reacted with such materials.

STATE OF THE ART

A crosslinked, bead-like, hydrophilic carrier material comprising a copolymer of a hydrophilic, ethylenically unsaturated, free-radically polymerizable monomer and of a polyfunctional cross linking monomer is known from GB-A 1,004,669. The hydrophilic monomer is acrylamide. N,N'-methylene-bis-(meth)acrylamide is used as the crosslinking monomer in an amount up to 10 percent by weight, optionally up to 20 percent by weight, whereby a gel-like swellable polymer is obtained.

According to DE-A 1,954,349, grains of such a hydrophilic carrier material are strengthened with a rigid, hydrophilic, macroporous material which can be synthesized from the same monomers, but which is highly crosslinked by between 30 and 90 percent by weight of N,N'-methylene-bis-(meth)acrylamide. Acrylamide derivatives which contain hydroxyl groups, such as N-(hydroxymethyl)acrylamide, may also take part in the synthesis of the strengthening material. The strong crosslinking increases rigidity in a water-swollen condition, which is advantageous if a liquid substrate is streamed through a column reactor filled with such a material.

PROBLEM AND SOLUTION

The invention has as its object the preparation of a bead-like carrier material which simultaneously meets requirements for high hydrophilicity, easy activation, high rigidity in a water-saturated condition, and high resistance to hydrolysis in aqueous alkali media.

A solution to this problem was found in a highly crosslinked copolymer in the synthesis of which an allyl monomer of the formula

$$CH_2=CH-CH_2-O-R-X_n$$

is used as a hydrophilic, ethylenically unsaturated, free-radically polymerizable monomer, wherein n is 0 and R is hydrogen, or n is a whole number between 1 and 5, and R is an (n+1)-valent aliphatic hydrocarbon group having 1 to (n+4) carbon atoms, and X is the same or different hydrophilic group selected from the group consisting of hydroxyl and $-(O-R')_m-OH$, wherein R' is ethylene or propylene and m is a number from 1 to 45, said copolymer being crosslinked by units of a polyfunctional monomer in which at least two ethylenically unsaturated free-radically polymerizable groups are linked by a chain containing carbonamide or ether groups.

It has been found that the required high resistance to hydrolysis can be met if the foregoing allyl monomers are used as the hydrophilic component and monomers having carbonamide or ether bonds are used as the crosslinking component. If the hydrophilic groups or the crosslinking bridges are bound in the polymer by more easily hydrolyzable bonds, such as ester groups, these bonds can be cleaved hydrolytically and then leave an anionic carboxyl group which severely alters the electrochemical condition of the polymer matrix. The allyl monomers used according to the invention contain no groups sensitive to hydrolysis. The carbonamide groups which may be present in the crosslinking units also show extensive stability to hydrolysis.

On the one hand, the hydroxyl groups present in the polymerized units of the allyl monomer provide the required hydrophilicity of the polymer and, on the other hand, provide a starting point for chemical activation. Thus, for example, by reaction of the polymer with a bis-epoxy compound, an oxirane group bound to the polymer and capable of reaction with biologically activated materials, is obtained. Neither this group nor a substrate later bound to it can be cleaved by alkaline hydrolysis.

PERFORMANCE OF THE INVENTION

Allyl alcohol and certain allyl ethers belong to the allyl monomers indicated by the formula. They can contain one or more hydroxyl groups and thereby impart hydrophilicity to differing degrees. The number of carbon atoms in the aliphatic hydrocarbon group R should not be significantly greater than the number of hydroxyl groups bound thereto in order to assure a high hydrophilicity, which requirement is expressed by the limitation of (n+4) carbon atoms per n hydroxyl groups. The hydroxyl groups need not be bound directly to the aliphatic hydrocarbon group R, but can be linked by way of oxyalkylene or polyoxyalkylene groups.

The allyl ethers are derived from polyfunctional aliphatic alcohols in which an hydroxyl group is etherified with allyl alcohol while one or more further hydroxyl groups is present as such or in oxalkylated form. They are preferably derived from at least trifunctional alcohols, in particular from glycerine. The parent aliphatic alcohol contains at most 4 carbon atoms more than hydroxyl groups. The latter can be reacted with 1 to 45, preferably 1 to 10, moles of ethylene oxide or propylene oxide. In addition to glycerine, already mentioned, examples of other polyfunctional aliphatic alcohols are ethylene glycol, propylene glycol, diethylene glycol, triethylene glycol and higher polyethylene or polypropylene glycols, sorbitol, mannitol, and similar sugar alcohols. 3-allyloxy-1,2-propane diol is the preferred allyl ether.

For crosslinking of the polymer, a polyfunctional monomer is used in which at least two ethylenically unsaturated free-radically polymerizable groups are linked by a chain containing a carbonamide or ether groups. N,N'-methylene-bis-acrylamide and -methacrylamide are preferred among the crosslinking monomers containing carbonamide groups. Divinyl ethers and diallyl ethers of the formula

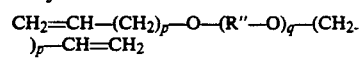

$$CH_2=CH-(CH_2)_p-O-(R''-O)_q-(CH_2)_p-CH=CH_2$$

are to be mentioned as crosslinking monomers in which at least two ethylenically unsaturated radically polymerizable groups are linked to one another by ether oxygen atoms. p can be 0 or 1. If p=0, then a divinyl ether is defined. If p=1, then a diallyl ether is defined.

q can also be 0 or 1. However, if q=1, the ether groups can also be bound to a core R" which as a rule itself does not contain a polymerizable group. It can be a hydrocarbon group—preferably aliphatic—having, for example, 2 to 12 carbon atoms, or a chain of several of such groups which are linked by oxygen atoms. These can optionally carry one or more hydroxyl groups. Examples of suitable ethers are ethylene glycol divinyl ether and -diallyl ether, butanediol divinyl ether, and -diallyl ether, diethylene glycol divinyl ether and -diallyl ether, triethylene glycol divinyl ether and -diallyl ether, pentaerythritol divinyl ether and -diallyl ether, and trimethylolpropane divinyl ether and -diallyl ether.

Preferably the polymer is composed only of the hydrophilic and the crosslinking monomer components. Other comonomers can be used to the extent they do not impermissibly decrease hydrophilicity or resistance to alkali. Accordingly, comonomers having longer unsaturated aliphatic groups or having aromatic groups are avoided if possible, as are comonomers derived from carboxylic acids and having ester or primary amide groups.

The fraction of allyl monomers in the polymer is advantageously between 10 and 90, preferably between 10 and 80 percent by weight and the fraction of the multiply unsaturated crosslinking monomer is between 90 and 10, preferably between 90 and 20 percent by weight.

PREPARATION OF THE COPOLYMER

The crosslinked, bead-like, activatable, hydrophilic carrier material according to the invention is prepared by the known principle of bead polymerization in inverted phase. For this, an aqueous or aqueous-alcohol solution of the monomers is distributed as droplets having a diameter of 5 to 1000 microns in an organic medium which is not totally miscible with water, such as gasoline hydrocarbons, chlorohydrocarbons, toluene, or mixtures thereof, and is brought to polymerization in this form by the addition of an initiator forming free radicals, optionally with warming. Conventional macromolecular distribution agents are used during the polymerization for stabilization of the state of distribution involving droplets. The preferred average particle diameter, expressed as a weight average, is 3 to 1000, preferably 5 to 200 microns. It is determined by the amount and the efficacy of the distribution agent and by the conditions of stirring during preparation of the suspension.

Suitable macromolecular distribution agents are copolymers of hydrophobic and hydrophilic monomers in such a ratio of amounts that the copolymer has a sufficient affinity for both phases of the monomer suspension. The affinity can be achieved by using a block or graft copolymer which is composed of chains or segments of two different polymers, which polymers are so chosen that, if the chains or segments containing them were isolated, those of one polymer would be soluble in the monomer solution and those of the other polymer would be soluble in the organic medium. Of course, it is often sufficient to use a statistical copolymer prepared from a mixture of at least two monomers of different polarity. Here too, the choice is such that a homopolymer of the one monomer would be soluble in the aqueous monomer solution and a homopolymer of the other monomer would be soluble in the organic medium. For polymerization using a gasoline hydrocarbon as the organic medium, a copolymer of a larger portion of a higher alkyl methacrylate and of a smaller portion of an hydroxyalkyl acrylate is suitable.

The usual peroxide or azo initiators are used as initiators for starting the polymerization in the suspended monomer phase. Azo-bis-cyanovalerianic acid or dibenzoyl peroxide are suitable, for example. The amount of the initiator and the temperature suitable for initiation of polymerization are chosen according to conditions known in the art. As a rule, polymerization is effected at 40° C. to 100° C.

Known methods for the preparation of highly crosslinked, bead-like, activatable, hydrophilic carrier materials having a macroporous structure and which can be used analogously for preparation of the polymers according to the invention are described, for instance, in German patent 27 22 751 and in EP-B 58 767.

USE OF THE BEAD CARRIER MATERIALS

The material can be used in batches, in which case it is suspended in a medium which is preferably aqueous and is brought to reaction, with stirring, with a substrate dissolved in the medium. The carrier material can then be filtered off and treated further in another medium or can be regenerated.

Because of its outstanding mechanical strength in a water-saturated condition, the carrier material is preferably adaptable to use in column reactors. The water uptake at saturation reaches values of 200 to 500 percent, by weight of the dry carrier material. Its swelling, particularly in the temperature range from 0° C. to 60° C., as a rule remains below 200 percent by volume. The expression "water-saturated" only means that the water content has reached a constant equilibrium value.

Because of its strong hydrophilic properties, or its slight residual hydrophobia, the carrier material according to the invention is distinguished by a particularly small hydrophobic reaction with biomolecules. For this reason it can be used with advantage for numerous methods of solid phase biotechnology. Solid phases serve for the separation of pure biomolecules of high molecular weight or low molecular weight from mixtures. Further, they serve as carriers for immobilized biomolecules, particularly enzymes, or as surfaces for analytic methods, e.g. immunoassays, or as biosensors. A group of important separation techniques for biomolecules is included in the concept of liquid chromatography. In these techniques, a tube through which liquid may flow is filled with the solid phase. The separation of biomolecules from an aqueous mixture follows directly on flowing through this filled tube.

For instance, the carriers according to the invention are suitable for the separation technique of gel permeation chromatography (GPC). In this, the molecules of a mixture are separated only on the basis of their differing sizes. Small molecules can permeate into smaller pores of the carrier materials than can larger molecules, so that the former migrate through a larger volume than the latter. Molecules that are larger than the largest pores migrate only in the free spaces between the particles of the carrier material and they are the first to be eluted.

In another class of method uses, the carrier material according to the invention is used in a chemically modified form. To this end, suitable ligands are bound covalently to the polymer, preferably onto the hydroxyl groups. Preferred are bonding methods which do not lead to formation of hydrolyzable bonds. Thus, acylating modifying agents are for the most part less suitable than those which lead to the formation of ether linkages. Reaction with modifying agents containing epoxy groups, which agents form β-hydroxyalkyl ether groups on reaction with hydroxyl groups, are particularly preferred. A universally useful modification method involves reaction of the carrier with a bis-epoxide, whereby one epoxy group fixes itself to the hydroxyl group of the carrier while the other is available for further reactions with biomolecules.

In this way, carriers modified with biomolecules are suitable, for example, for so-called affinity chromatography (AIC). For this, carrier materials are needed which show the highest possible selective bonding affinity for a specific molecule, The bonding must not be so strong that the bound molecules can only be eluted under drastic conditions. Carriers which meet these requirements are generally designated as affinity sorbents. They contain a so-called bioligand covalently bonded to the solid phase, which bioligand specifically bonds to the biocomplementary molecule and in this way separates it from a mixture in highly purified form.

The following Examples are given by way of illustration.

WORKING EXAMPLES

A. Preparation of a bead carrier material 18.75 g of 3-allyloxy-1,2-propane diol and 31.25 g of N,N'-methylene-bis-acrylamide are dissolved in a mixture of 104.8 g of water and 26.2 g of methanol. The solution is suspended as droplets in an organic phase of 473 g of n-heptane and 1.5 g of a copolymer of $C_{12}$-$C_{18}$-alkyl methacrylates and 2-hydroxyethyl acrylate (80/20). The suspension is warmed to 40° C. and polymerization is started by the addition of 1 g of 4,4'-azo-bis-4-cyanovalerianic acid. After a polymerization time of 14 hours at 40° C. -60° C., the bead polymer formed is filtered off, washed, and dried. The average particle size of the moist product is 40–60 microns.

B. Testing resistance to alkali

In case of alkaline hydrolysis, carboxylate groups bound to the polymer would be formed by cleavage of carbonamide groups, which carboxylate groups would be noticeable by an increased bonding effect with Cytochrome C. The absorption behavior before and after alkali treatment is determined according to the following test.

5 g of the bead polymer are slurried in 50 ml of 1 molar NaOH and let stand for 72 hours at 23° C. Then the polymer is filtered off and washed to neutrality with water.

For the absorption test, a conventional HPLC-apparatus (High Performance Liquid Chromatography) having a "Rheodyne" injection valve, spectrophotometer, and recorder (Knauer Company, Bad Homburg) is used. As the empty column, an HR 10/10 column, 100 mm long and 10 mm in interior diameter (Pharmacia-LKB, Sweden) is used.

The following solutions are used:
Solution I: 0.01 molar $NaH_2PO_4$+0.1 molar KCl+NaOH to pH 7.4
Solution II: 2 mg Cytochrome C (Merck, Nr. 24804) in 1 ml of solution I.
The column is filled with a slurry of the bead polymer in Solution I and inserted into the HPLC-apparatus after sedimentation ceases. The system is then equilibrated with Solution I until the photometer gives a constant signal at 410 nanometers and a sensitivity of 0.16.

Then, 40 microliters of Solution II are injected and chromatographed at a flow of 1 ml/min, and the reduced elution volume is determined. For this, the interval from the time of injection to the maximum of the elution peak is measured on the measuring graph which has been drawn by the recorder and is converted to volume. By division by the geometric bed volume, the reduced elution volume, $V_{red}$, for Cytochrome C is obtained.

From 5 test runs with the untreated bead polymer, $V_{red}$+0.85 was determined. From 7 test runs with the alkali-treated bead polymer, $V_{red}$+0.89. Since the peak areas were of the same size within limits of measurement of ±5%, an alteration of the carrier material by alkali treatment can be excluded.

C. Gel permeation chromatography of proteins using bead polymer A in a column Column: length 238 mm; interior diameter 10 mm ("Superperformance", Merck, Darmstadt)
HPLC-apparatus: Type LKB, Pharmacia; titanium pump; "RHeodyne" injection valve; recorder
Solution III: 100 millimolar NaCl in 10 millimolar Na-phosphate buffer, pH=7.2
Solution IV: 500 millimolar NaCl in 10 millimolar Na-phosphate buffer, pH=7.2
Flow rate: 0.4 milliliter/minute.
Detection of the eluate was by UV-photometry at 260 nanometers. The proteins listed in the following Table were dissolved in Solution III in the concentrations noted.

The column was equilibrated with Solution IV. For calibration, 200 microliters of a solution of 400 microliters of 10% $NaNO_3$ in Solution IV and 25 microliters of a 0.015% DNA solution were applied. As soon as the calibrating substance was eluted, the column was equilibrated with Solution III and 200 microliter portions of the protein solution were added at 20 minute intervals. The elution volumes, $V_e$, were determined. The separation behavior of the column is given by the quotients $V_e/V_t$, where $V_t$ is the total column volume.

TABLE

| Calibrating substances: | | $V_e/V_t$ | $M_w$ |
|---|---|---|---|
| DNA | | 0.36 | >$10^7$ |
| $NaNO_3$ | | 0.93 | 85 |
| Proteins: | | | |
| ferritin | 0.05 mg/ml | 0.40 | 4.5($10^5$) |
| catalase | 10 mg/ml | 0.41 | 2.4($10^5$) |
| alcohol dehydrogenase | 5 mg/ml | 0.43 | 1.4($10^5$) |
| bovine serum albumin | 5 mg/ml | 0.43 | 6.8($10^4$) |
| peroxidase | 5 mg/ml | 0.51 | 4.0($10^4$) |
| chymotrypsinogen A | 1 mg/ml | 0.63 | 2.5($10^4$) |
| cytochrome C | 0.5 mg/ml | 0.85 | 1.25($10^4$) |

The results show a sharp separation behavior for proteins up to a molecular weight $M_w$ of 7($10^4$). The results are shown graphically in accompanying FIG. 1.

D. Epoxidation of the bead polymer A 6 g of the bead polymer A were combined with 6.7 ml of 1,4-butanediol-diglycidyl ether in 60 ml of toluene, with stirring, then refluxed at the boiling point for 22 hours. The product was suction filtered, flooded several times with acetone, suction filtered after 7 hours, and finally dried under vacuum. Oxirane oxygen: 0.11 percent by weight=68 micromoles/gram. [Determination of the oxirane oxygen is according to R. Axen (L. Sunberg, J. Porath, Journal of Chromatography, 90, 1974, p. 89).]

E. Reaction of the epoxidated bead polymer D with penicillinamidase 4 ml of a solution of penicillinamidase from *E. coli* in 0.5 molar phosphate buffer (pH=7.5) having an enzyme activity of 127.5 Units/ml and 3 ml of 0.5 molar K-phosphate buffer were added to 1 g of the bead polymer D and left to react for 72 hours at 23° C. (1 unit of enzyme activity=12 micromole of hydrolyzed penicillin-G-potassium from 2% solution in 0.05 molar K-buffer, pH=7.8; determination of the hydrolyzate was by alkalimetric titration in a device maintaining constant pH.)

The product was then suction filtered, washed 5 times with 30 ml portions of water and 2 times with a wash liquid consisting of 0.05 percent by weight of p-hydroxybenzoic acid methyl ester, 2 percent by weight of isopropyl alcohol, and 0.1 molar K-phosphate buffer. The yield of moist product was 4.3 g.

The reaction product was investigated according to a standard method (Provisional Information Sheet "Eupergit-PcA", Röhm GmbH, Weiterstadt, Germany) and the following results were found:
Activity yield: 66% of the enzyme employed
Product activity: 78 Units per gram of moist product.

What is claimed is:

1. A highly crosslinked, alkali-resistant, hydrophilic activatable carrier consisting of beads of a copolymer consisting of (A) 10–90 percent by weight of an allylic monomer of the formula $$CH_2=CH-CH_2-O-R-X_n,$$

wherein n is 0 and R is hydrogen or n is a whole number from 1 to 5 and R is an (n+1)-valent aliphatic hydrocarbon having 1 to (n+4) carbon atoms, and X is the same or different and is selected from the group consisting of hydroxy and $-(O-R')_m-OH$, wherein R' is ethylene or propylene and m is a whole number from 1 to 45, and (B) 90 to 10 percent by weight of a crosslinking polyfunctional monomer having at least two ethylenically unsaturated, radically polymerizable groups linked by a chain containing a carbonamide or ether group, said beads having an average particle size of 3 microns to 1000 microns and being prepared by bead polymerization in inverted phase by dispersing an aqueous or aqueous-alcohol solution of the monomer as droplets in an organic liquid which is not totally miscible with water and initiating polymerization by addition of an initiator forming free radicals.

2. A carrier as in claim 1 wherein said crosslinking polyfunctional monomer is N,N'-methylene-bis-(meth)acrylamide.

3. A carrier as in claim 1 wherein said crosslinking polyfunctional monomer is selected from the group consisting of divinyl ethers and diallyl ethers.

4. A carrier as in claim 1 wherein said beads having an average particle size of 5 microns to 200 microns.

* * * * *